(12) United States Patent
Tatenuma

(10) Patent No.: US 10,605,622 B2
(45) Date of Patent: Mar. 31, 2020

(54) MAGNETIC DETECTION DEVICE

(71) Applicant: Mitsubishi Electric Corporation, Tokyo (JP)

(72) Inventor: Yoshinori Tatenuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 15/956,965

(22) Filed: Apr. 19, 2018

(65) Prior Publication Data

US 2019/0195655 A1  Jun. 27, 2019

(30) Foreign Application Priority Data

Dec. 26, 2017 (JP) .................. 2017-248923

(51) Int. Cl.
*G01D 5/14* (2006.01)
*G01D 3/028* (2006.01)
*G01P 3/487* (2006.01)
*G01D 5/16* (2006.01)

(52) U.S. Cl.
CPC ............. *G01D 5/14* (2013.01); *G01D 3/028* (2013.01); *G01P 3/487* (2013.01); *G01D 5/142* (2013.01); *G01D 5/16* (2013.01)

(58) Field of Classification Search
CPC ............ G01D 5/14; G01D 5/142; G01D 5/16; G01D 3/28; G01P 3/487
See application file for complete search history.

(56) References Cited

U.S. PATENT DOCUMENTS

| | | | | |
|---|---|---|---|---|
| 5,779,367 A | * | 7/1998 | Obara | .................. F16C 29/00 324/207.24 |
| 8,299,783 B2 | * | 10/2012 | Fernandez | .......... G01D 5/2448 324/202 |
| 2007/0285086 A1 | * | 12/2007 | Yokotani | ............ G01D 5/24438 324/207.21 |
| 2010/0106452 A1 | * | 4/2010 | Tatenuma | ............ G01D 5/2451 702/150 |
| 2011/0101965 A1 | * | 5/2011 | Shimauchi | ............. G01D 5/145 324/207.11 |
| 2015/0015175 A1 | * | 1/2015 | Ariga | ........................ H02P 6/16 318/653 |
| 2017/0059359 A1 | * | 3/2017 | Kawasaki | .............. G01D 5/145 |
| 2017/0356760 A1 | * | 12/2017 | David | .................... G01D 5/142 |

FOREIGN PATENT DOCUMENTS

WO  2016/139791 A1  9/2016

* cited by examiner

*Primary Examiner* — Dominic E Hawkins
(74) *Attorney, Agent, or Firm* — Sughrue Mion, PLLC; Richard C. Turner

(57) ABSTRACT

To obtain a magnetic detection device which can detect a direction of movement of a magnetic moving body immediately right after a reset release of the magnetic detection device. The magnetic detection device includes a signal change detector which detects the peak, bottom, and gradient of an output signal of a first magnetoelectric conversion element group and the peak, bottom, and gradient of an output signal of a second magnetoelectric conversion element group, wherein a direction of movement of a magnetic moving body is detected based on the gradient of increase or decrease of one of the output signal or the output signal at the timing of a detection of the peak or bottom of the other.

9 Claims, 9 Drawing Sheets

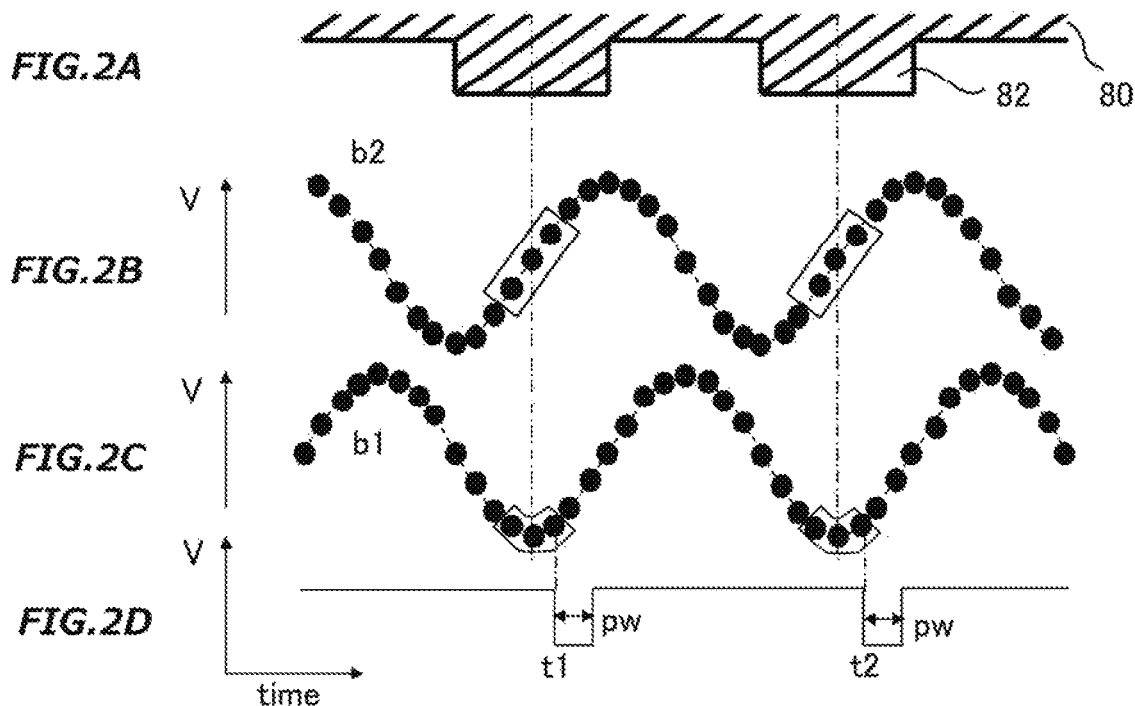
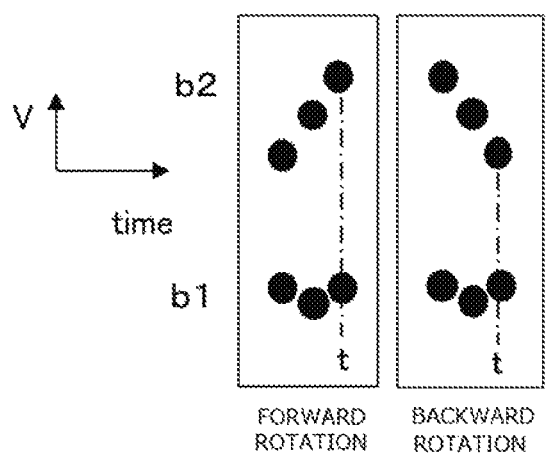

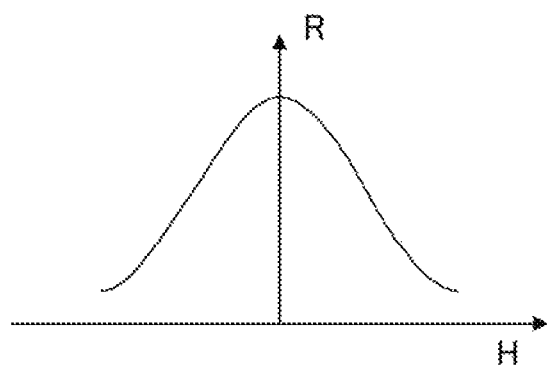
FIG.10
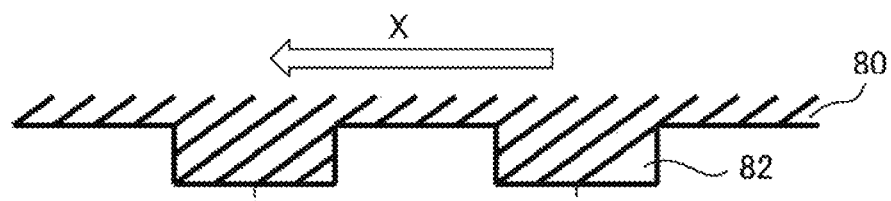
FIG.11A
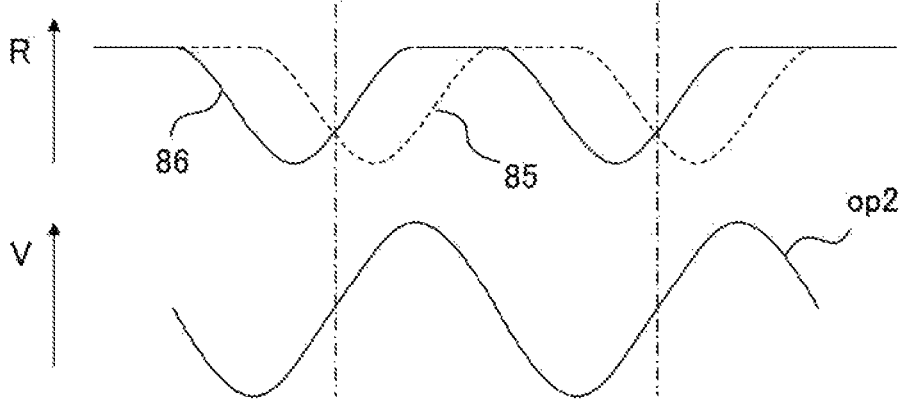
FIG.11B
FIG.11C

MAGNETIC DETECTION DEVICE

BACKGROUND OF THE INVENTION

Field of the Invention

The present invention relates to a magnetic detection device using magnetic conversion elements, and particularly to a magnetic detection device which detects a fluctuation of magnetic field based on a movement of a magnetic moving body and detects a direction of the movement of the magnetic moving body.

Description of the Related Art

As is well known, a variety of magnetic detection devices are proposed, each of which includes a bridge circuit which converts a change in the resistance value of each magnetoelectric conversion element due to a fluctuation of magnetic field, that is, a change in magnetic flux density, to a voltage, and outputs the converted voltage, wherein a direction of movement of a magnetic moving body acting magnetically on the magnetoelectric conversion elements is detected based on an output voltage of the bridge circuit. This kind of magnetic detection device is utilized as, for example, an in-car rotation sensor which detects a direction and speed of rotation of a vehicle engine.

However, the magnetic detection device is such that the accuracy of detection can decrease when the temperature or the like of an environment in which the magnetoelectric conversion elements are installed changes due to variations in manufacturing characteristics, variations in temperature characteristic, or the like, of the magnetoelectric conversion elements. The present inventors, et al. propose a magnetic detection device shown in Patent Literature 1 aimed at solving the decrease in detection accuracy.

[Patent Literature 1] WO20116/139791

The magnetic detection device disclosed in Patent Literature 1 includes a first magnetoelectric conversion element group which is disposed facing a magnetic moving body and which converts a fluctuation of magnetic field in a direction of movement of the magnetic moving body to a change in the quantity of electricity; a second magnetoelectric conversion element group which is disposed facing the magnetic moving body in a position different in a direction of movement of the magnetic moving body from a position in which the first magnetoelectric conversion element group is disposed, and which converts a fluctuation of magnetic field in a direction of movement of the magnetic moving body to a change in the quantity of electricity; a first comparison circuit which generates a binarized first comparison signal based on a comparison of a first output signal based on the conversion to the quantity of electricity by the first magnetoelectric conversion element group with a first threshold; a second comparison circuit which generates a binarized second comparison signal based on a comparison of a second output signal based on the conversion to the quantity of electricity by the second magnetoelectric element group with a second threshold; a first threshold adjustment unit which can adjust the first threshold; a second threshold adjustment unit which can adjust the second threshold; a first analog digital conversion circuit which converts the first output signal to a digital value; and a second analog digital conversion circuit which converts the second output signal to a digital value, wherein the configuration is such as to be able to carry out at least one of the following:

1. the second analog digital conversion circuit converts the second output signal to a digital value at a time point at which a peak or bottom value of the first output signal is detected, and the second threshold adjustment unit adjusts the second threshold based on a comparison of the converted digital value with a predetermined reference value, and 2. the first analog digital conversion circuit converts the first output signal to a digital value at a time point at which a peak or bottom value of the second output signal is detected, and the first threshold adjustment unit adjusts the first threshold based on a comparison of the converted digital value with a predetermined reference value.

Incidentally, as heretofore described, this kind of magnetic conversion device is such that in a kind of case where the first output signal based on the conversion of the quantity of electricity by the first magnetoelectric conversion element group and the second output signal based on the conversion of the quantity of electricity by the second magnetoelectric conversion element group are significantly offset due to the effect of manufacturing variations or temperature characteristics of magnetic detection elements, and deviate from the threshold potential of the first comparison circuit or the second comparison circuit, the first comparison signal outputted from the first comparison circuit or the second comparison signal outputted from the second comparison circuit remains at a fixed value, and there is a problem in that a direction of movement of the magnetic moving body cannot be detected, thus decreasing the accuracy of detection.

In order to solve the problem, the heretofore mentioned magnetic detection device disclosed in Patent Literature 1 is intended to adjust the first threshold with which to compare the first comparison signal or the second threshold with which to compare the second comparison signal, and thereby to detect a direction of movement of the magnetic moving body with a high degree of accuracy even when the amplitude range of an output signal of a bridge circuit deviates from the threshold of each comparison circuit.

Specifically, a configuration is such that a reset circuit is provided in the magnetic detection device and that after an initialization by the reset circuit, a rectangular wave output different in time width in response to a direction of movement of the magnetic moving body starts to be generated, in synchronism with the first comparison signal or the second comparison signal, at a time point at which the rise and decay time points of the first comparison signal come to alternate with the rise and decay time points of the second comparison signal.

However, in order to adjust the threshold of each comparison circuit, a configuration is such that an amount of movement equivalent to several ones of magnetic protrusions of the magnetic moving body is adjusted so that appropriate offsets are given to the first output signal and the second output signal using the first analog digital conversion circuit and the second analog digital conversion circuit, respectively, and a period of time is required for the adjustment. Also, as no reliable output is available in the period of time of adjustment, a countermeasure is taken in such a way as to fix an output and start the output after the first output signal and the second output signal are given the respective appropriate offsets. For this reason, there occurs a new problem of it being impossible to respond to a case in which a detection of a direction of movement of the magnetic moving body is intended to be carried out immediately right after a reset release.

SUMMARY OF THE INVENTION

The invention, having been contrived in order to solve these kinds of problems, has for its object to provide a magnetic detection device which can detect a direction of movement of a magnetic moving body immediately right after a reset release of the magnetic detection device.

The magnetic detection device according to the invention is a magnetic detection device which detects a movement of a magnetic moving body to be detected and which has a first magnetoelectric conversion element group having a magnetoelectric conversion element which is disposed facing the magnetic moving body and disposed arranged in a direction of movement of the magnetic moving body and which outputs a detection signal along with a movement of the magnetic moving body; and a second magnetoelectric conversion element group having magnetoelectric conversion elements which are disposed facing the magnetic moving body and disposed arranged in a direction of movement of the magnetic moving body and which each output a detection signal along with a movement of the magnetic moving body. The first magnetoelectric conversion element group and the second magnetoelectric conversion element group are disposed so that an output signal of one of the two magnetoelectric conversion element groups has a phase difference which may be deemed to be 90 degrees with respect to an output signal of the other.

The magnetic detection device includes a signal change detector which detects the peak and bottom of the output signal and the gradient of increase and decrease of the output signal based on the output signal of the first magnetoelectric conversion element group or on the output signal of the second magnetoelectric conversion element group; and a movement direction determiner which determines a direction of movement of the magnetic moving body based on the gradient of increase or decrease of the output signal of the other at the timing of the signal change detector's detection of the peak or bottom of the output signal of one of the first magnetoelectric conversion element group or the second magnetoelectric conversion element group. In this case, a direction of movement of the magnetic moving body is detected based on an output signal of the movement direction determiner.

According to the magnetic detection device of the invention, a movement detection can be carried out based on the gradient of increase or decrease of the output signals of the magnetoelectric conversion element groups, and so there is an advantageous effect that it is possible to carry out a movement detection even when there is an offset due to the effect of manufacturing variations or temperature characteristics of the magnetoelectric conversion element groups, and that it is possible to carry out a detection of a movement of the magnetic moving body immediately right after a reset release of the magnetic detection device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2D are diagrams illustrating an operation of the magnetic detection device according to Embodiment 1 of the invention.

FIGS. 3A and 3B are signal waveform diagrams of analog digital converters of the magnetic detection device according to Embodiment 1 of the invention.

FIG. 10 is a diagram representing a magnetic field and resistance characteristics of a GMR which is a magnetoelectric conversion element.

FIGS. 11A to 11C are diagrams illustrating an operation of the magnetic detection device based on the basic technology of the invention.

DETAILED DESCRIPTION OF THE PREFERRED EMBODIMENTS

Hereafter, a detailed description will be given, with reference to the drawings, of preferred embodiments of a magnetic detection device according to the invention. In the individual embodiments, a description will be given with identical signs given to identical or equivalent portions, but a redundant description may be omitted in some portions.

Embodiment 1

Before describing the magnetic detection device according to the invention, first, a description will be given of a basic technology of the magnetic detection device according to the invention.

Figure 8A:
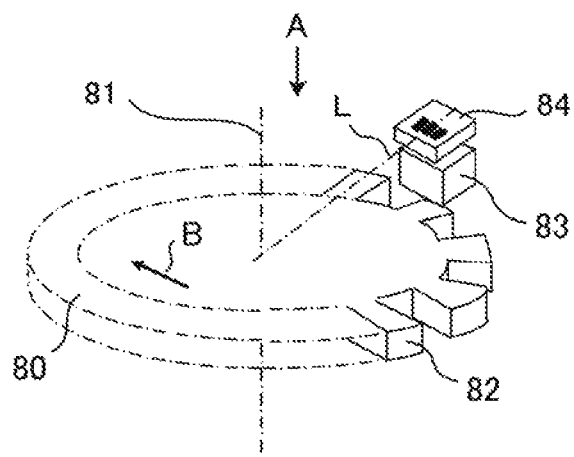
FIGS. 8A and 8B are illustrative diagrams showing a configuration of a magnetic circuit of a magnetic detection device based on a basic technology of the invention.
Figure 8B:
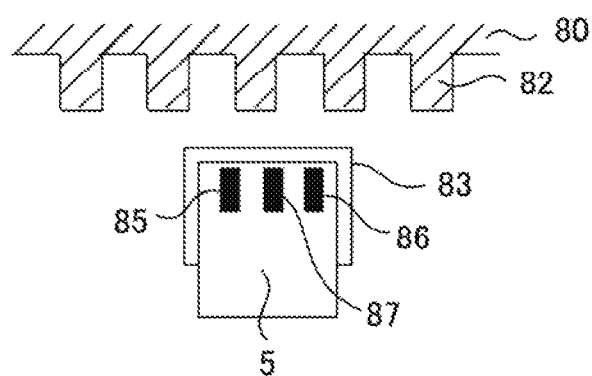

FIG. 8A is a configuration diagram of a magnetic circuit of the magnetic detection device based on the basic technology of the invention, and FIG. 8B is an illustrative diagram viewed from the direction of arrow A of FIG. 8A. In FIGS. 8A and 8B, a magnetic moving body 80 to be detected, which is formed of a magnetic disk, can rotate around a rotation axis 81 in the direction of arrow B or in the opposite direction from arrow B. The magnetic moving body 80 rotates in synchronism with, for example, a rotation of an engine crankshaft. A plurality of magnetic protrusions 82 are formed at predetermined intervals on the periphery of the magnetic moving body 80.

A magnet 83 is disposed so as to face the magnetic protrusions of the magnetic moving body 80 via a predetermined interval and is magnetized parallel to the rotation axis 81. Magnetic detection elements 85, 86, and 87 which are magnetoelectric conversion elements are provided in a substrate 84 fixed to the magnet 83. The magnet 83 and the magnetic moving body 80 form one portion of the magnetic circuit. As shown in FIGS. 8A and 8B, the magnetic detection elements 85, 86, and 87 are arranged facing the magnetic protrusions 82 of the magnetic moving body 80. Also, the magnetic detection elements 85 and 86 are symmetrically disposed, across the magnetic detection element 87, about a centerline L of the magnet 83 perpendicular to the rotation axis 81.

Herein, the magnetoelectric conversion element means an element, such as an anisotropic magneto resistance (AMR) element, a giant magneto resistance (GMR) element, a tunnel magneto resistance (TMR) element, or a Hall element, which can convert a fluctuation of magnetic field or flux to an electric signal.

Figure 9:
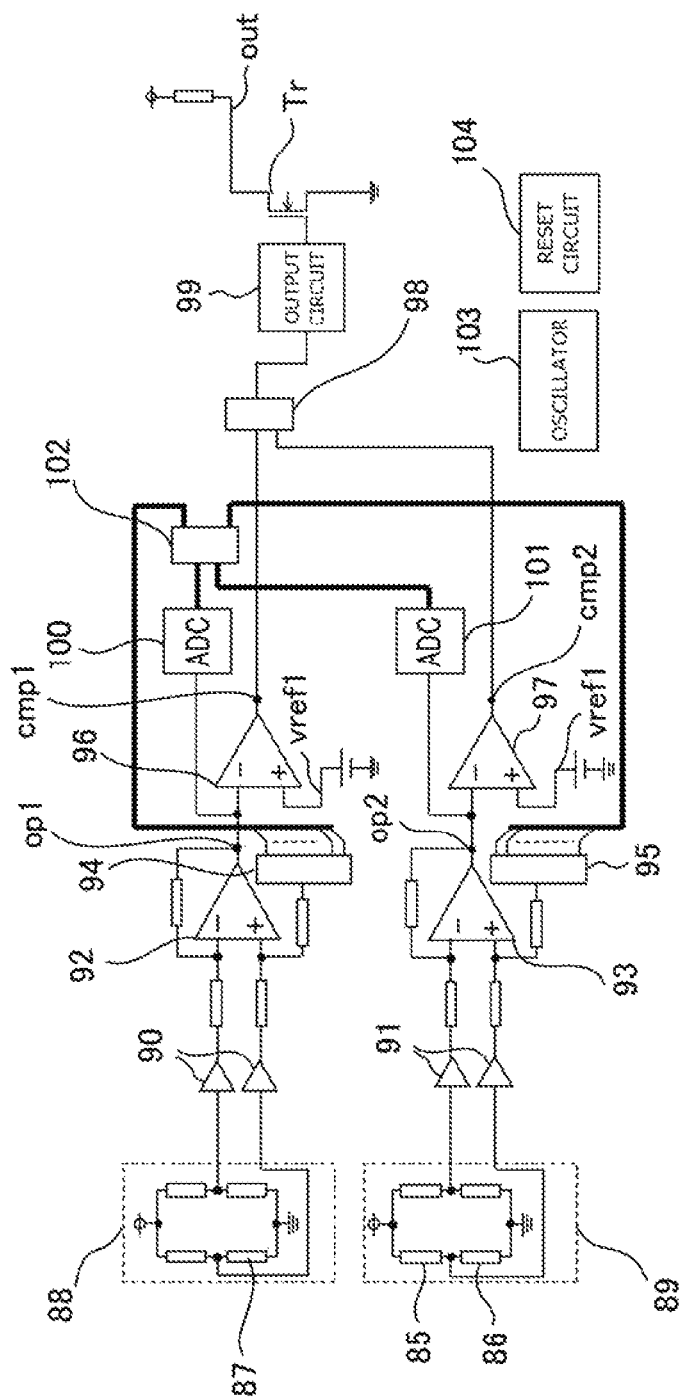
FIG. 9 is a circuit configuration diagram of the magnetic detection device based on the basic technology of the invention.

FIG. 9 is a circuit configuration diagram of the magnetic detection device based on the basic technology of the invention. In FIG. 9, the magnetic detection element 87 configures a first bridge circuit 38 by being combined with other resistance elements, and the magnetic detection elements 85 and 86 configure a second bridge circuit 89 by being combined with other resistance elements. An output of the first bridge circuit 88 and an output of the second bridge circuit 89 are inputted into a first differential amplifier 92 which is a first amplification unit and a second differential amplifier 93 which is a second amplification unit, by way of first buffers 90 and second buffers 91, respectively. The first differential amplifier 92 and the second differential amplifier 93, in order to set reference potentials, include a first digital analog conversion unit (hereafter called the first DAC) 94 and a second digital analog conversion unit (hereafter called the second DAC) 95, respectively. A first differentially amplified signal op1 and a second differentially amplified signal op1, which are amplified by predetermined amplification factors by the first differential amplifier 92 and the second differential amplifier 93, are inputted into a first comparison circuit 96 which is a first comparison unit and a second comparison circuit 97 which is a second comparison unit, respectively. A first comparison signal cmp1 which is an output of the first comparison circuit 96 and a second comparison signal cmp2 which is an output of the second comparison circuit 97 each form a rectangular wave which is a result of comparison with a comparison potential vref1, and are sent to a movement direction determiner 98 which is a movement direction determination unit, and the movement direction determiner 98 distinguishes between the directions of movement of the magnetic moving body 80. An output signal of the movement direction determiner 98 passes through an output circuit 99, drives an output transistor Tr, and turns to an output signal out of the magnetic detection device.

Herein, as the magnetic detection elements 85, 86, and 87 have manufacturing variations or temperature characteristics, the first differentially amplified signal op1 and the second differentially amplified signal op2 sometimes deviate substantially from the respective comparison potentials vref1. For this reason, a first analog digital conversion unit (hereafter called the first ADC) 100 and a second analog digital conversion unit (hereafter called the second ADC) 101 are included, wherein the waveform of the first differentially amplified signal op1 and the waveform of the second differentially amplified signal op2, while being AD converted by the first ADC 100 and the second ADC 101, respectively, are calculated by a control circuit 102 which is a control unit, and thus, appropriate offsets are given to the first differentially amplified signal op2 and the second differential amplified signal op2 using the first DAC 94 and the second DAC 95, respectively. As the movement direction determiner 98, the control circuit 102, and the like, each operate as a logic circuit, an oscillator 103 and a reset circuit 104 supply them with necessary clocks and reset signals.

As for the characteristics of the magnetic detection elements 85, 86, and 87, FIG. 10 shows, specifically, characteristics of a GMR element. A vertical axis R represents a resistance value, and a horizontal axis H represents a magnetic field strength. When the magnetic field strength increases, the resistance value decreases, and conversely, when the magnetic field strength decreases, the resistance value increases. In this way, a change in magnetic field brings out a change in electrical characteristics.

Next, a description will be given, using FIGS. 11A to 11C and FIGS. 12A to 12C, of how the respective waveforms of the first and second differentially amplified signals op1 and op2 change depending on a direction of movement of the magnetic moving body 80.

The magnetic detection elements 85, 86, and 87 each undergo a change in the resistance value when the magnetic field strength changes, as described in FIG. 10. A magnetic field generated from the magnet 83 is affected by the magnetic protrusions 82 of the magnetic moving body 80, thus changing the magnetic field strength in the position of each of the magnetic detection elements 85, 86, and 87. FIGS. 11A to 11C are diagrams of the case in which the magnetic moving body 80 is moved to the left of the paper. The magnetic moving body 80 moves in the direction shown by arrow X of FIG. 11A, and thereby the respective resistance values of the magnetic detection elements 85 and 86 change alternately, as shown in FIG. 11B. From the left of FIG. 11B, first, the magnetic detection element 86 starts to change, and subsequently, the magnetic detection element 85 changes. The magnetic detection elements 85 and 86 configure the second bridge circuit 89, and a change in the resistance values generates a change in voltage. The change in voltage is inputted into the second differential amplifier 93, thus generating the change in voltage shown by the second differentially amplified signal op2 of FIG. 11C.

Figure 12A:
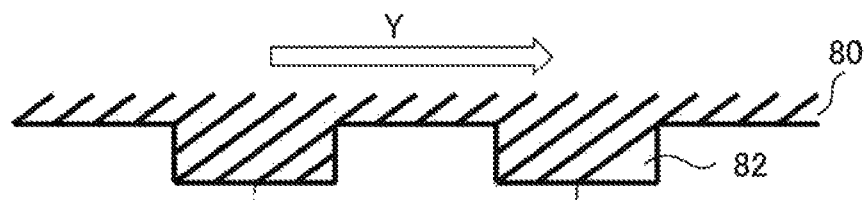
FIGS. 12A to 12C are diagrams illustrating an operation of the magnetic detection device based on the basic technology of the invention.
Figure 12B:
Figure 12C:
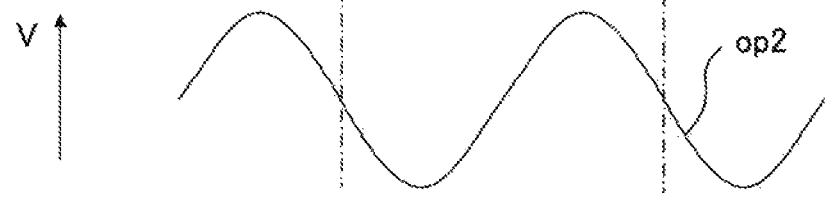

FIGS. 12A to 12C are diagrams of the case in which the magnetic moving body 80 is moved to the right of the paper. That is, FIGS. 12A to 12C show the case in which the magnetic moving body 80 is moved in the opposite direction from in FIGS. 11A to 11C. The magnetic moving body 80 moves in the direction shown by arrow Y of FIG. 12A, and thereby the magnetic detection element 85 starts to change, and subsequently, the magnetic detection element 86 changes, as shown in FIG. 12B. Then, the change in voltage shown by the second differentially amplified signal op2 of FIG. 12C is generated. That is, the waveform of the second differentially amplified signal op2 turns to a waveform such as is reversed substantially 180 degrees depending on a direction of movement of the magnetic moving body 80.

Figure 13A:
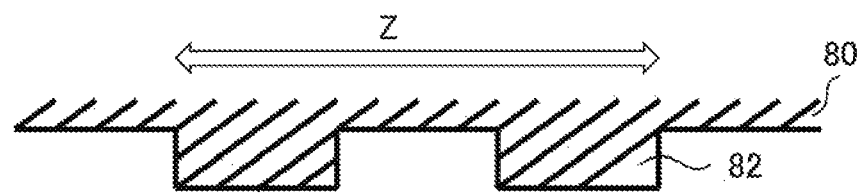
FIGS. 13A to 13C are diagrams illustrating an operation of the magnetic detection device based on the basic technology of the invention.
Figure 13B:
Figure 13C:
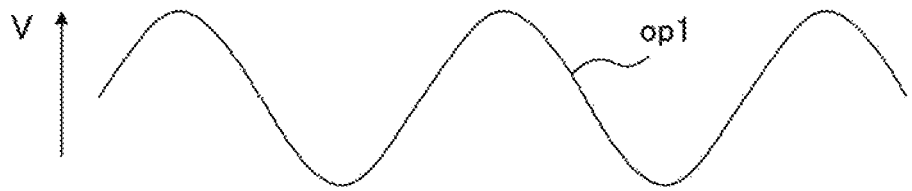

Next, a description will be given, in FIGS. 13A to 13C, of a waveform of the first differentially amplified signal op1. The magnetic detection element 87, as being disposed so as to have the magnetic detection elements 85 and 86 one on each side thereof, generates a change in the resistance value such as shown in FIG. 13B without depending on the directions of movement of the magnetic moving body 80 shown by arrow Z of FIG. 13A. As the magnetic detection element 87 configures the first bridge circuit 88, the waveform of the first differentially amplified signal op2 is amplified by the first differential amplifier 92 and turns to a waveform such as in FIG. 13C.

In this way, the waveform of the second differentially amplified signal op2 turns to a waveform such as is reversed substantially 180 degrees depending on a direction of movement of the magnetic moving body 80, while the waveform of the first differentially amplified signal op1 has no change depending on a movement direction, and so, subsequent to the first and second differentially amplified signals op1 and op2, the respective waveforms of the first and second comparison signals cmp1 and cmp2 also each change in the same way, thus enabling the movement direction determiner 98 to logically distinguish between the movement directions.

Figure 1:
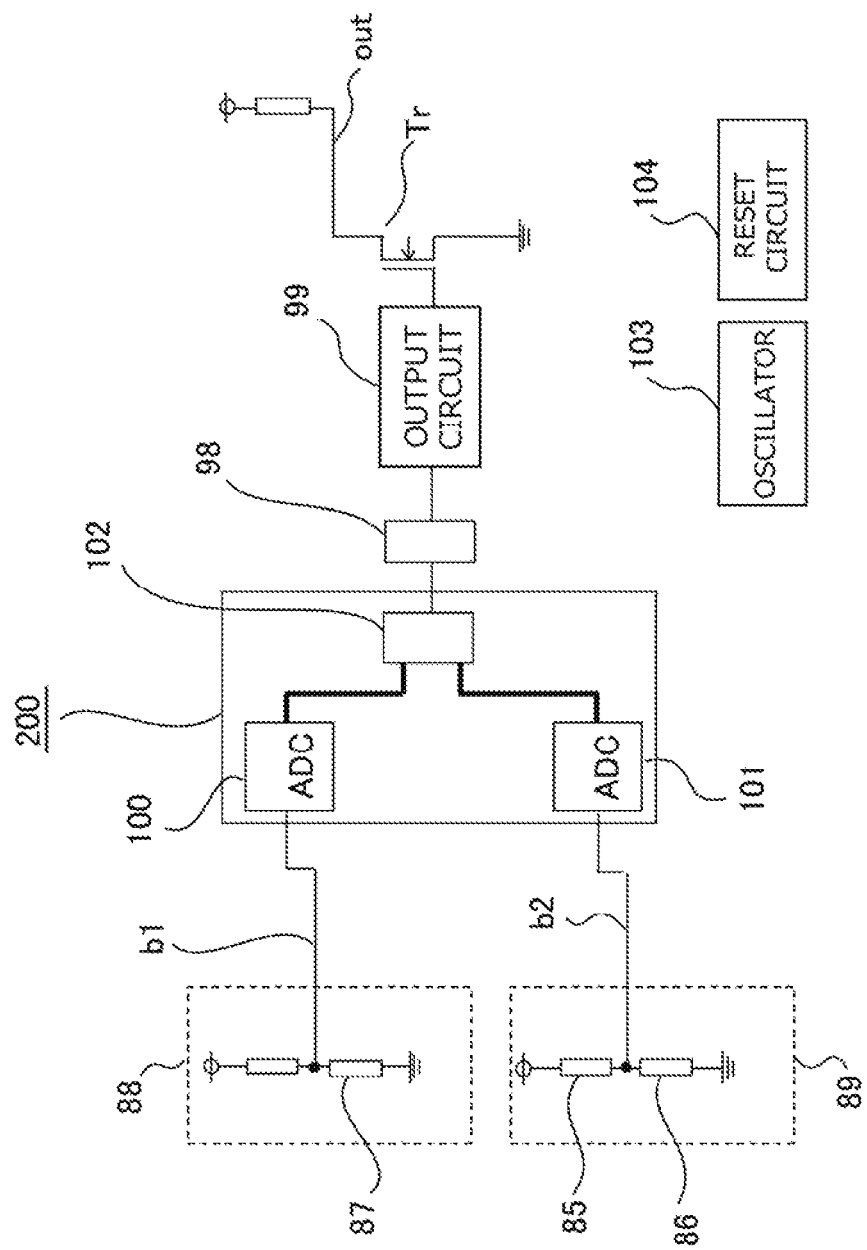
FIG. 1 is a circuit configuration diagram of a magnetic detection device according to Embodiment 1 of the invention.

Next, a description will be given of a magnetic detection device according to Embodiment 1 of the invention. FIG. 1 is a circuit configuration diagram of the magnetic detection device according to Embodiment 1 of the invention.

The magnetic detection device according to Embodiment 1 includes the first bridge circuit 88 and the second bridge circuit 89, as shown in FIG. 1. The first bridge circuit 88 is configured including the magnetic detection element 87, and the second bridge circuit 89 is configured including the magnetic detection elements 85 and 86. Herein, an output signal of the first bridge circuit 88 is represented by b1, and an output signal of the second bridge circuit 89 is represented by b2.

The first bridge circuit 88 and the second bridge circuit 89 are connected to the first ADC 100 and the second ADC 101, respectively. The first ADC 100 and the second ADC 101 are controlled by the control circuit 102. The first ADC 100, the second ADC 101, and the control circuit 102 configure a signal change detector 200 which is a signal change detection unit. The signal change detector 200 is connected to the movement direction determiner 98, and an output signal of the movement direction determiner 98 passes through the output circuit 99 and controls the output transistor Tr of the magnetic detection device. The movement direction determiner 98 determines a direction of movement of the magnetic moving body 80 based on the phase relationship between the output signal b1 of the first bridge circuit 88 and the output signal b2 of the second bridge circuit 89.

Next, a description will be given, using FIGS. 2A to 2D and FIGS. 3A and 3B, of a detection principle of the magnetic detection device according to Embodiment 1.

When the magnetic moving body 80 shown in FIG. 2A is moving while rotating around the rotation axis 81 of the magnetic moving body 80, the signal waveform of the output signal b2 of the second bridge circuit 89 and the signal waveform of the output signal b1 of the first bridge circuit 88 have a phase difference which may be deemed to be 90 degrees, in other words, a phase difference of substantially 90 degrees, between one signal waveform and the other, as seen in FIGS. 2B and 2C. This waveform principle is the same as the principle described in FIGS. 11A to 11C, FIGS. 12A to 12C, and FIGS. 13A to 13C, and herein, is omitted from description.

Dots on the signal waveform of each of the output signals b2 in FIG. 2B and b1 in FIG. 2C are connected in series in order to show that the first ADC 100 and the second ADC 101 each have read a value at every dot. The first ADC 100 and the second ADC 101 carry out their respective reads at substantially the same time points at predetermined time intervals. An increase and decrease in the values when the first ADC 100 and the second ADC 101 each carry out the read are shown in FIGS. 3A and 3B. When a rotation in one of the directions of rotation of the magnetic moving body 80 is called a forward rotation, and a rotation in the other direction is called a backward rotation. FIG. 3A shows a forward rotation direction, wherein the signal waveform of the output signal b2 is in an increasing direction when the signal waveform of the output signal b1 bottoms out. Also, FIG. 3B on the right side of the paper shows a backward rotation direction, wherein the signal waveform of the output signal b2 is in a decreasing direction when the signal waveform of the output signal b1 bottoms out.

That is, the rotation is determined to be forward when the signal waveform of the output signal b2 increases singly in the same course as at time t at which it is determined that the signal waveform of the output signal b1 bottoms out, and the rotation is determined to be backward when the signal waveform of the output signal b2 decreases singly in the same course as at time t at which it is determined that the signal waveform of the output signal b1 bottoms out. The signal change detector 200 makes a determination of whether the signal waveform of the output signal b1 and the signal waveform of the output signal b2 bottom out, increase, or decrease, and the movement direction determiner 98 makes the heretofore described movement direction determination. In this way, a movement direction is determined based on both the bottom of the output signals b1 and b2 and the gradient of the increase or decrease thereof. Depending on the definition of forward and backward rotation directions, the determination can also be made based on the increase or decrease in the signal waveform of the output signal b2 when the signal waveform of the output signal b1 peaks out, and it is possible to respond by changing between determination methods appropriately from one definition to another.

Next, a description will be given of FIG. 2D. In accordance with the heretofore described principle, the signal change detector 200 catches signal changes in each of the output signals b1 and b2, and the output circuit 99, at each time t1 and t2 at which the movement direction determiner 98 determines a movement direction, outputs an output signal with a pulse width of a time width pw conformed to the movement direction (the forward rotation). In this case, the movement direction is the forward rotation direction, and a certain fixed time width pw is outputted. Herein, when the movement direction is, for example, the backward rotation direction, a pulse of a time width different from in the forward rotation direction can be outputted.

It can be difficult for the signal change detector 200 to distinguish between data obtained respectively bar the first and second ADCs 100 and 101 due to the effect of noise or the like. In this case, the signal change detector 200, by incorporating a digital filter or an alternative thereto, can distinguish between changes in the respective signal waveforms of the output signals b1 and b2.

Also, the characteristics of the first and second ADCs 100 and 101 are such that a conversion time period and a bit precision are set in conformity with the accuracy of output signals required of the magnetic detection device. Also, it is because one of the first and second ADCs 100 and 101 is required to distinguish between a single increase and decrease in the same course as at a time point at which the other detects a bottom, that the first ADC 100 and the second ADC 101 are required to read the respective signals at substantially the same time point. Consequently, although depending on the accuracy of output signals required of the magnetic detection device, it is desirable to make the distinguishment with a plurality of two or more ADCs.

As above, it is possible to distinguish between movement directions based on the shape of the respective output signal waveforms of the first and second bridge circuits 88 and 89 even when there is a large offset between the respective outputs of the first and second bridge circuits 88 and 89 which results from manufacturing variations or temperature characteristics of the magnetic detection elements 85, 86, and 87, and so it is possible to output, right after a reset release, in conformity with a movement of the magnetic moving body 80 without requiring any period of time in which to make an offset adjustment.

Embodiment 2

Figure 4:
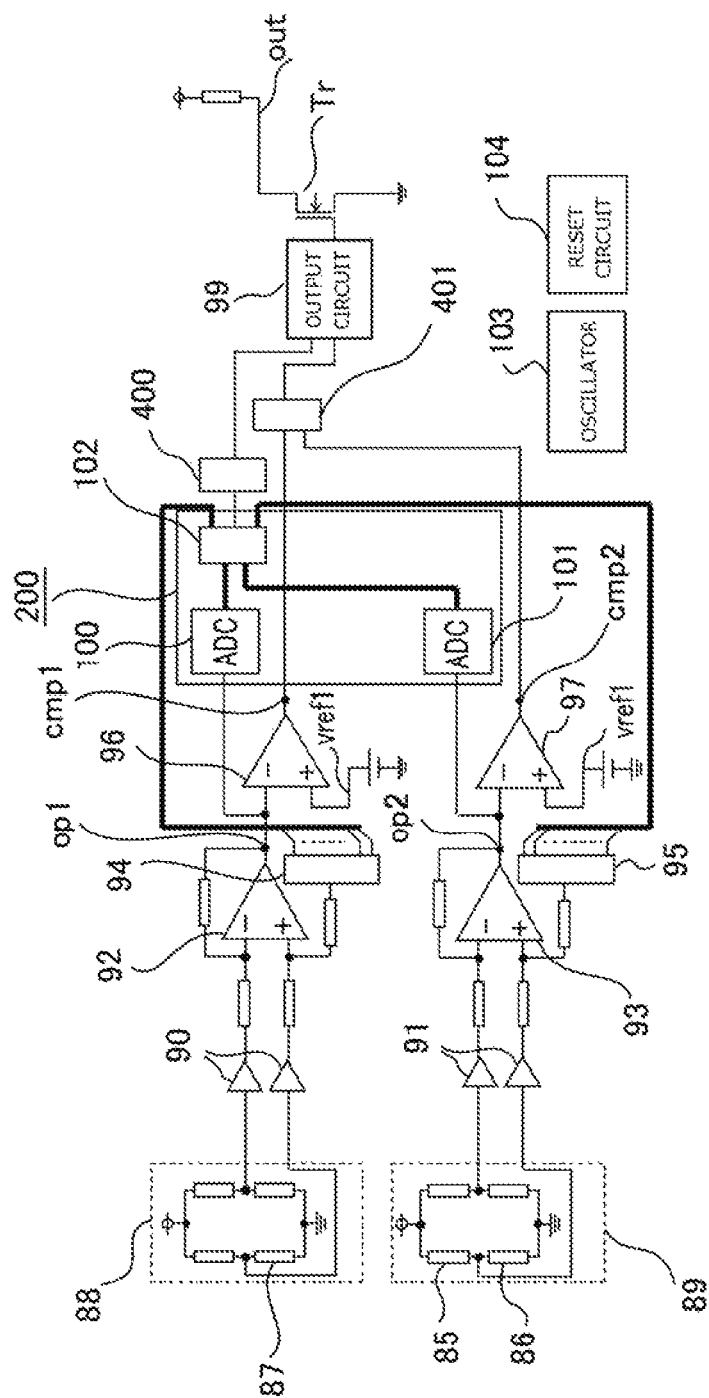
FIG. 4 is a circuit configuration diagram of a magnetic detection device according to Embodiment 2 of the invention.

Next, a description will be given of a magnetic detection device according to Embodiment 2 of the invention. FIG. 4 is a circuit configuration diagram of the magnetic detection device according to Embodiment 2.

In FIG. 4, the difference in circuit configuration from the magnetic detection device described in FIG. 9 is that the magnetic detection device according to Embodiment 2 includes a first movement direction determiner 400 which is a first movement direction determination unit which is connected to a signal change detector 200 configured of the first ADC 100, the second ADC 101, and the control circuit 102 and into which a control signal of the control circuit 102 is inputted, and a second movement direction determiner 401 which is a second movement direction determination unit into which the first comparison signal cmp1 and the second comparison signal cmp2 are inputted. The others are of the same circuit configuration as that of the magnetic detection device of FIG. 9.

Figure 5:
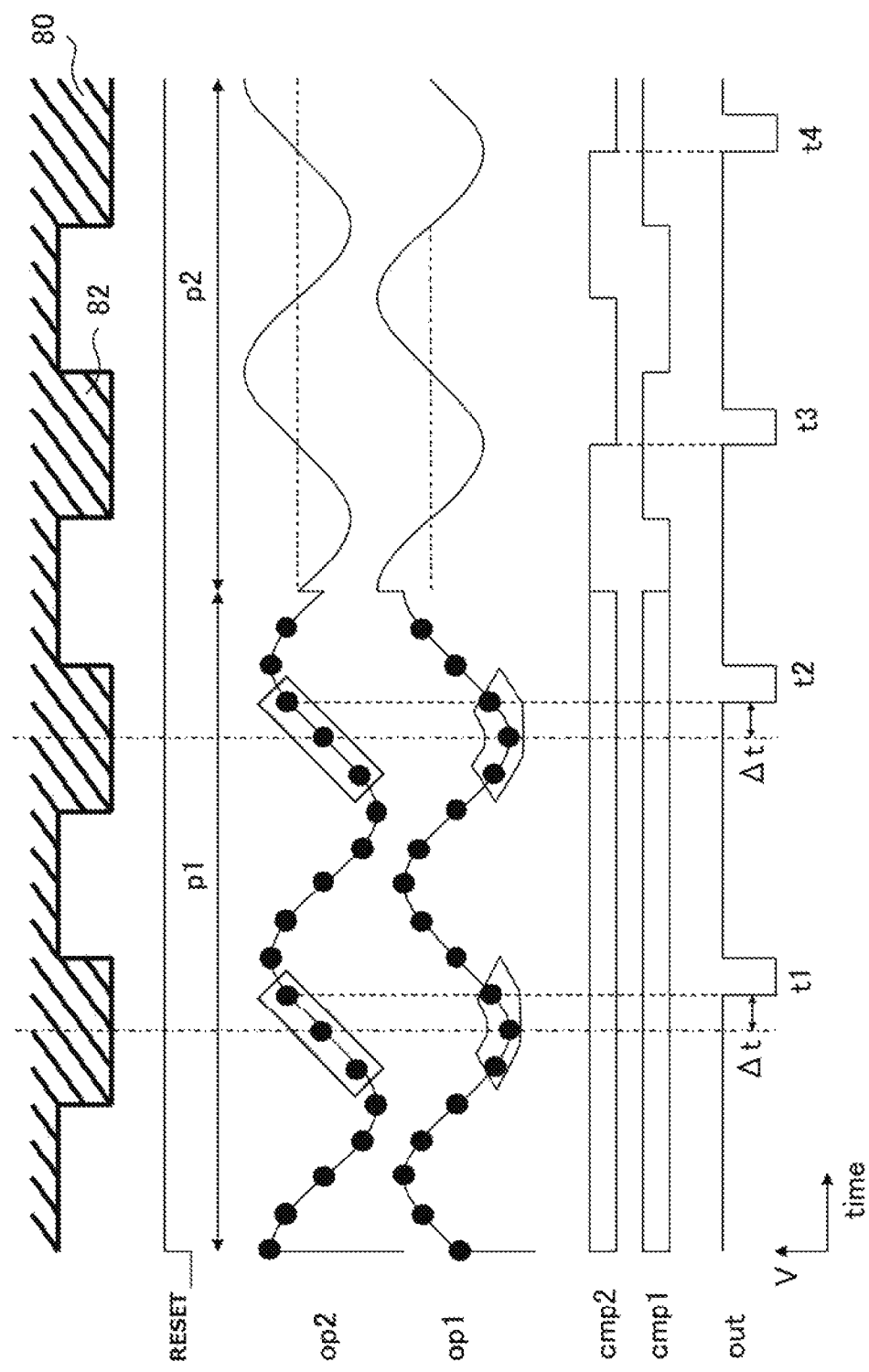
FIG. 5 is a diagram illustrating an operation of the magnetic detection device according to Embodiment 2 of the invention.

FIG. 5 is a diagram illustrating an operation of the magnetic detection device according to Embodiment 2. When the magnetic moving body 80 is rotating around the rotation axis 81 of the magnetic moving body 80, the signal waveform of the first differentially amplified signal op1 of the first differential amplifier 92 and the signal waveform of the second differentially amplified signal op2 of the second differential amplifier 93 have a phase difference which may be deemed to be 90 degrees, in other words, a phase difference of substantially 90 degrees, between one signal waveform and the other, as seen in FIG. 5. This waveform principle is the same as the principle described in FIGS. 12A to 12C and FIGS. 13A to 13C, and herein, is omitted from description.

Based on a reset release signal of the reset circuit 104, the first ADC 100 and the second ADC 101 start to convert the first differentially amplified signal op1 and the second differentially amplified signal op2 to digital signals, respectively, at substantially the same time point. As a result of the sequence of digital conversions, the signal change detector 200 can recognize that the waveform of the first differentially amplified signal op1 bottoms out, and at the same time, can recognize that the waveform of the second differentially amplified signal op2 increases singly in the same course, and at time t1 at which the movement direction determiner 400 determines a movement direction, the output circuit 99 outputs an output signal with a pulse width of a time width pw conformed to the movement direction (the forward rotation). In this case, the movement direction is the forward rotation direction, and a certain fixed time width pw is outputted. Herein, when the movement direction is, for example, the backward rotation direction, a pulse of a time width different from in the forward rotation direction can be outputted.

In the same way, at time t2 too, an output signal out having a pulse width of a fixed time width pw is outputted by way of the output circuit 99, as heretofore described.

FIG. 5 illustrates a first period p1 and a second period p2. In the first period p1, a determination is made by the first movement direction determiner 400 by the heretofore described method. In the first period p1, the first differentially amplified signal op1 and the second differentially amplified signal op2 are digital converted by the first ADC 100 and the second ADC 101, respectively, and so, peak and bottom values of each of the respective amplitudes of the first and second differentially amplified signals op1 and op2 can be held temporarily by the control circuit 102. The control circuit 102, by using the peak and bottom values, can cause the first DAC 94 and the second DAC 95 to give appropriate offsets to the first differential amplified signal op1 and the second differentially amplified signal op2, respectively.

Herein, the magnetic detection device according to Embodiment 2 gives predetermined offsets, one to each of the first and second DACs 94 and 95, at a predetermined timing on the verge of or after the end of the first period p1. In the second period p2, the state is such that the first differentially amplified signal op1 and the second differentially amplified signal op2 are already given the respective appropriate offsets, and that the first comparison circuit 96 and the second comparison circuit 97 are outputting the first comparison signal cmp1 and the second comparison signal cmp2, respectively. In this state, the second movement direction determiner 401 can detect a movement direction of the magnetic moving body 80 based on the first and second comparison signals cmp1 and cmp2 and can output the detected movement direction by way of the output circuit 99. The movement direction determiner 401 determines that the movement direction is the forward direct ion in the event that the second comparison signal cmp2 decays when the potential of the first comparison signal cmp1 is high, and that the movement direction is the backward direction in the event that the second comparison signal cmp2 rises when the potential of the first comparison signal cmp1 is high. The output circuit 99 has an input signal from the movement direction determiner 400 in the first period p1 and has an input signal from the movement direction determiner 401 in the second period p2. The first period p1 is such that it only continues until a desired number of teeth pass after a reset release, and that desired offsets are given one to each of the first and second DACs 94 and 95 by the time the second period p2 starts. Herein, time point t3 refers to substantially the same time point as a decay time point of the second comparison signal cmp2, and the output circuit 99 outputs a fixed time width pw in synchronism with the signal of the movement direction determiner 401, as heretofore described. In the same way, at time point t4 too, the output circuit 99 outputs a fixed time width pw.

Herein, the predetermined offsets are given one to each of the respective reference potentials of the first and second differential amplifiers 92 and 93, but instead of connecting a power source to the respective comparison potentials vref1 of the first and second comparison circuits 96 and 97, the first DAC 94 and the second DAC 95 are connected to the first comparison circuit 96 and the second comparison circuit 97, respectively, and thus the predetermined offsets can also be given one to each of the first and second comparison circuits 96 and 97. That is, a circuit operation such as not to fix the respective outputs of the first and second comparison signals cmp1 and cmp2 is required.

Figure 6:
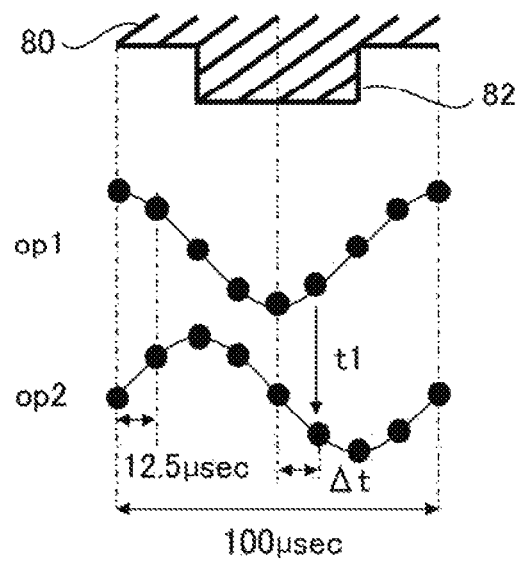
FIG. 6 is a signal waveform diagram of analog digital converters according to Embodiment 2 of the invention.

To separate the first period p1 and the second period p2 as heretofore described depends on the accuracy required of the magnetic detection device. The magnetic detection device according to Embodiment 2 outputs to the magnetic protrusions 82 of the magnetic moving body 80 at the center of each of the magnetic protrusions 82, but a gap from each center defines the accuracy. The gap is represented by Δt in FIG. 5. A description will be given exemplifying a case in which the frequency of the magnetic protrusions 82 of the magnetic moving body 80, which is required of the magnetic detection device, is 0 Hz to 10 kHz. FIG. 6 schematically shows respective signal waveforms of the first and second differentially amplified signals op1 and op2 and a shape of the magnetic protrusion 82. FIG. 6 shows a case in which the frequency is 10 kHz. The conversion time period of the first and second ADCs 100 and 101 is taken to be 12.5 μsec. That is, the first and second. ADCs 100 and 101 convert the first and second differentially amplified signals op1 and op2 to digital values, respectively, every 12.5 μsec.

As heretofore described, it can be recognized that the first differentially amplified signal op1 bottoms out at time t1 and that the second differentially amplified signal op2 increases singly in the same course as at time t1, and so a movement direction of the magnetic moving body 80 can be distinguished and outputted at the timing of time t1. At this time, a time difference of Δt is generated from the center of the magnetic protrusion 82 of the magnetic moving body 80. In this example, a time difference of 12.5 μsec or more is generated. When the accuracy required of the magnetic detection device is, for example, 1/10 of the heretofore described, the conversion time period of an analog digital converter has to be 1.25 μsec. This is generally an analog digital converter classified as a high-speed type, and has a problem in that the circuit scale thereof also increases. In order to minimize the circuit scale, a response measure will be taken in such a way as described hereinafter. The required accuracy is implemented in the second period p2, and in the first period p1 right after a reset release, the accuracy lowers, but a movement direction can be distinguished and outputted with a permissible accuracy maintained. Herein, the accuracy in the second period p2 is determined by the differential amplifier and the comparator, but because of an analog circuit, the accuracy can be achieved with relative ease without increasing the circuit scale.

A description will be given, using FIG. 7, of a relationship between a required maximum frequency F max of the magnetic protrusion 82 of the magnetic moving body 80 and a conversion time period CT of the first ADC 100 or the second ADC 101.

Figure 7:
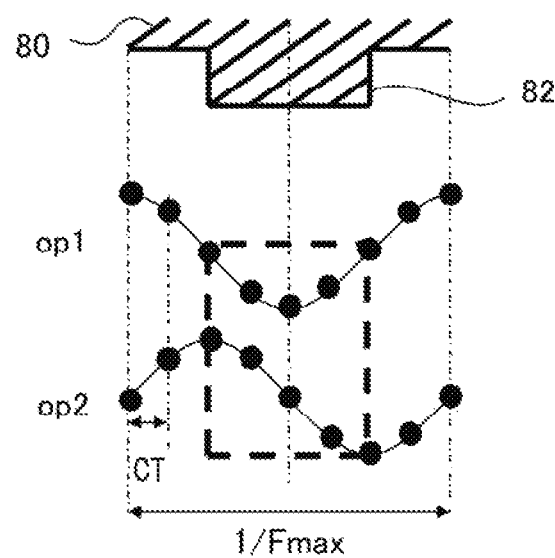
FIG. 7 is a signal waveform diagram of the analog digital converters according to Embodiment 2 of the invention.

When the bottom of the first differentially amplified signal op1 is detected, it is necessary to recognize a single increase or decrease of the second differentially amplified signal op2 in the same course, but as the first differentially amplified signal op1 and the second differentially amplified signal op2 have a phase difference of substantially 90 degrees therebetween, at least three or more points of measurement of the first ADC 100 or the second ADC 101 are required in the waveform below the amplitude center of the first differentially amplified signal op1, as shown in FIG. 7. For this purpose, there needs to be a conversion time period for which at least four or more points can be measured taking into consideration a time lag between before and after. Consequently, the relationship between the maximum frequency F max of the magnetic protrusion 82 and the conversion time period CT of the analog digital converter is represented by the following expression.

$$CT \le 1/F\,max \times 1/2 \times 1/4$$

As there is also a case in which a response measure against noise is taken using a digital filter or the like, the right side of the above expression is only a maximum, and the conversion time period CT needs to be suppressed to the maximum or below.

As above, the first ADC 100 and the second ADC 101 convert respective input signals, one each, at time points which may be deemed to be the same time point, or in other words, at substantially the same time point, and have respective conversion time periods which may be deemed to be the same time period, or in other words, are substantially the same time period, and the first ADC 100 or the second ADC 101 is such that when the maximum frequency of the input signal is represented by F max and the conversion time period by CT, it is required that the relationship of $CT \le 1/F\,max \times 1/2 \times 1/4$ is established between F max and CT.

In the heretofore mentioned magnetic detection device according to Embodiment 2 too, when there is a large offset between respective outputs of the first and second bridge circuits 88 and 89 which results from manufacturing variations or temperature characteristics of the magnetic detection elements 85, 86, and 87, it is possible to distinguish between movement directions based on the shape of the respective output signal waveforms of the first and second bridge circuits 88 and 89, and so it is possible to output, right after a reset release, in conformity with a movement of the magnetic moving body 80 without requiring any period of time in which to make an offset adjustment.

A description has so far been given of Embodiment 1 and Embodiment 2 according to the invention, but the invention, not being limited thereto, the individual embodiments can be freely combined, or any of the individual embodiments can be appropriately modified or omitted, without departing from the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A magnetic detection device which detects a movement of a magnetic moving body, the magnetic detection device comprising:
   a first magnetoelectric conversion element group having a magnetoelectric conversion element which is disposed facing the magnetic moving body in a direction of the movement of the magnetic moving body and which outputs a first output signal based on the movement of the magnetic moving body;
   a second magnetoelectric conversion element group which comprises magnetoelectric conversion elements disposed facing the magnetic moving body in the direction of the movement of the magnetic moving body, and outputs a second output signal based on the movement of the magnetic moving body, the first magnetoelectric conversion element group and the second magnetoelectric conversion element group being disposed so that the first output signal and the second output signal have a phase difference of substantially 90 degrees;
   a signal change detector which detects one from among a peak of the first output signal and a bottom of the first output signal and detects a gradient of the second output signal corresponding to a timing of the detected one from among the peak and the bottom, of the first output signal; and
   a movement direction determiner which determines the direction of the movement of the magnetic moving body based on whether the detected gradient indicates an increase or a decrease, of the second output signal, at the timing at which the signal change detector detected the one from among the peak or the bottom, of the first output signal, and outputs a determination signal indicative of the direction of the movement of the magnetic moving body.

2. The magnetic detection device according to claim 1, wherein the signal change detector includes:

a plurality of analog digital converters corresponding to input signals comprising the first output signal and the second output signal, respectively;
a control circuit which controls the plurality of analog digital converters,
wherein the plurality of analog digital converters convert the respective input signals, one each, at time points which may be deemed to be the same time point, and have respective conversion time periods which may be deemed to be the same time period, and
wherein, when a maximum frequency of each input signal is represented by F max, and a conversion time period among the respective conversion time periods is represented by CT, a relationship of $CT \leq 1/F\ max \times 1/2 \times 1/4$ is established.

3. A magnetic detection device which detects a movement of a magnetic moving body, the magnetic detection device comprising:
a first magnetoelectric conversion element group having a magnetoelectric conversion element which is disposed facing the magnetic moving body in a direction of the movement of the magnetic moving body and outputs a first detection signal based on the movement of the magnetic moving body;
a second magnetoelectric conversion element group which comprises magnetoelectric conversion elements disposed facing the magnetic moving body in the direction of the movement of the magnetic moving body outputs a second detection signal based on the movement of the magnetic moving body;
a first amplifier which is connected to the first magnetoelectric conversion element group and outputs a first output signal based on the first detection signal;
a second amplifier which is connected to the second magnetoelectric conversion element group and outputs a second output signal the second detection signal, the first magnetoelectric conversion element group and the second magnetoelectric conversion element group being disposed so that the first output signal and the second output signal have a phase difference of substantially 90 degrees;
a signal change detector which detects one from among a peak of the first output signal and a bottom of the first output signal and detects a gradient of the second output signal corresponding to a timing of the detected one from among the peak and the bottom, of the first output signal;
a first movement direction determiner which determines the direction of the movement of the magnetic moving body based on whether the detected gradient indicates an increase or a decrease of the second output signal, at the timing at which the signal change detector detected the one from among the peak or the bottom, of the first output signal;
a first comparator which compares the first output signal of the first amplifier with a comparison potential and outputs a first comparison signal;
a second comparator which compares the second output signal of the second amplifier with the comparison potential and outputs a second comparison signal; and
a second movement direction determiner which determines the direction of the movement of the magnetic moving body based on a phase difference between the first comparison signal and the second comparison signal,
wherein the direction of the movement of the magnetic moving body is detected based on an output signal of the first movement direction determiner or an output signal of the second movement direction determiner.

4. The magnetic detection device according to claim 3, wherein a first period and a second period are provided at startup,
in the first period, the direction of the movement of the magnetic moving body is detected based on the output signal of the first movement direction determiner, and
in the second period, the direction of the movement of the magnetic moving body is detected based on the output signal of the second movement direction determiner.

5. The magnetic detection device according to claim 4, wherein an adjustment of respective reference potentials of the first amplifier and the second amplifier is made at a start of the first period.

6. The magnetic detection device according to claim 5, wherein the adjustment of the reference potentials is continued in the second period.

7. The magnetic detection device according to claim 4, wherein an adjustment of respective reference potentials of the first comparator and the second comparator is made at a start of the first period.

8. The magnetic detection device according to claim 7, wherein
the adjustment of the reference potentials is continued in the second period.

9. The magnetic detection device according to claim 3, wherein the signal change detector includes:
a plurality of analog digital converters corresponding to input signals comprising the first output signal and the second output signal, respectively;
a control circuit which controls the plurality of analog digital converters,
wherein the plurality of analog digital converters convert the respective input signals, one each, at time points which may be deemed to be the same time point, and have respective conversion time periods which may be deemed to be the same time period, and
wherein, when a maximum frequency of each input signal is represented by F max, and a conversion time period among the respective conversion time periods is represented by CT, a relationship of $CT \leq 1/F\ max \times 1/2 \times 1/4$ is established.

* * * * *